Oct. 1, 1935.  I. LEVITON  2,015,858
ELECTRIC OUTLET
Filed Dec. 11, 1931
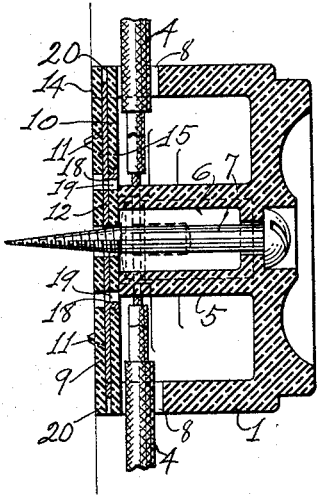
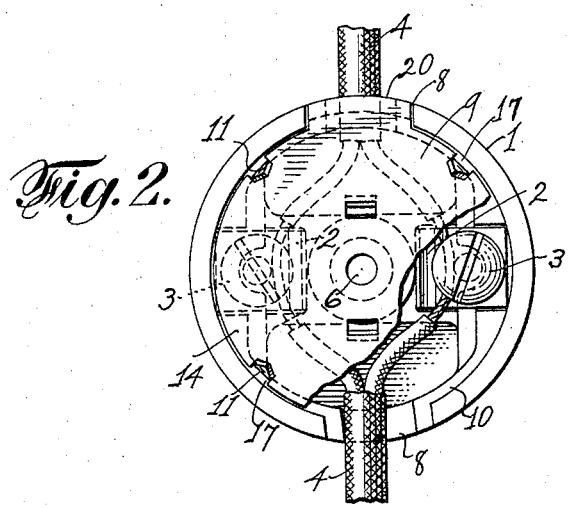
Isidor Leviton, INVENTOR
BY Gifford, Scull & Burgess ATTORNEYS Patented Oct. 1, 1935

2,015,858

UNITED STATES PATENT OFFICE 2,015,858

ELECTRIC OUTLET

Isidor Leviton, Brooklyn, N. Y., assignor to Leviton Manufacturing Company, Brooklyn, N. Y., a corporation of New York Application December 11, 1931, Serial No. 580,267

2 Claims. (Cl. 173—338)

This invention relates to an electric outlet that can be conveniently connected to a pair of electric wires in such a manner that it constitutes a socket into which the usual electric light plug can be inserted. Any desired number of such outlets can be attached to a pair of wires for electric light plugs or other electric plugs.

Heretofore in installing electric outlets of this character the fastening means therefor served as a shaft or axis about which the device could be turned with the consequent danger of loosening it and also the danger of disconnecting the contacts thereof from the electric wires or even short-circuiting the electric wires.

By the present invention an electric outlet of this type is provided which is caused to remain in fixed position as soon as the fastening means therefor are tightened because of one or more pins or projections thereon penetrating the surface of the wall, floor or ceiling to which the device is attached.

The invention will be understood from the description in connection with the accompanying drawing in which Fig. 1 is a vertical section through an illustrative embodiment of the invention and Fig. 2 is an end view of the device partly broken away.

In the drawing reference character 1 indicates a cup-shaped housing of rigid, insulating material, such as "Bakelite", for example. The housing may be cylindrically shaped, but is preferably made in the shape of a truncated cone. It may, however, be circular or polygonal in cross section.

Spring contacts 2 are located in recesses that are provided therefor inside of the housing 1 for blades of a plug of the well-known sort. The contacts 2 are provided with the usual binding screws 3. Reference character 4 indicates a duplex electric wire to which the device is connected by stripping the insulation from the two wires and clamping them under the binding screws 3, as most clearly indicated in Fig. 2. Openings are provided through the outer end of the housing 1, through which openings the blades of a plug can be inserted to make contact with the contacts 2.

A central extension 5 extends from the outer or closed end of the housing 1 nearly to the other or open end thereof. A central longitudinal opening 6 extends through the housing and extension 5 to accommodate a fastening means, such as a screw 7, which can be screwed into a wall or the like to keep the device in place.

Recesses 8 are provided in the side walls of the housing 1 at the open end. The central radial lines of these recesses are less than 180° apart for a purpose to be described below.

A closure 9 is provided for the open end of the housing 1. It is made of a shape to fit the inside of the end of the housing with the outer side thereof flush with the end of the housing. It is provided with a central hole through which the fastening screw 7 extends. A ledge or stop 10 is provided along the inside of the open end of the housing terminating in the same plane as the end of the extension 5. It terminates a distance short of the end of the housing equal to the thickness of the disc 9. The rim of the disc 9 rests against the ledge 10 and the middle portion thereof against the end of the extension 5.

Pins or projections 11 are provided on the outer side of the closure 9 offset from the center of this closure to penetrate the surface of the wall or the like to which the device is attached. The pins or projections 11 may be conveniently provided as struck-up, triangularly shaped tongues from a metal disc-shaped plate 12 that constitutes a portion of the closure 9. Plates 14 and 15 of insulating material on opposite sides of the plate 12 also constitute portions of the disc 9. The tongues 11 may pass through notches 17 along the edge of the insulating plate 14 and the ends of these tongues may be bent inwardly slightly to keep the plate 14 in place on the plate 12. Tongues 18 may be struck up from the plate 12 in the opposite direction from the tongues 11 and pass through openings 19 in the plate 15 with the ends of the tongues 18 bent over the edges of these openings to keep the plate 15 in assembled relation with the other parts of the closure 9.

Lugs or extensions 20 are provided on the closure 9 to fit the recesses 8 above referred to. The recesses 8 and the lugs 20 are less than 180° apart in a circumferential direction so that the closure 9 cannot be put in the housing 1 with the pins or projections 11 on the inside so that when the screw 7 is tightened to fasten the device to a surface the pins 11 necessarily penetrate the surface and prevent the device from being turned around the screw 7 with the consequent danger arising therefrom.

I claim:

1. In an electric outlet, a closure comprising a metal sheet and insulating sheets on opposite sides thereof, said metal sheet having pointed projections extending beyond the outer surface of one of said insulating sheets.

2. In an electric outlet, a closure comprising a metal sheet and insulating sheets on opposite sides thereof, said metal sheet having pointed projections extending beyond the outer surface of one of said insulating sheets, and struck up tongues attaching it to the other one.

ISIDOR LEVITON.